(12) United States Patent
Selvam et al.

(10) Patent No.: US 12,699,546 B1
(45) Date of Patent: Aug. 4, 2026

(54) ADAPTIVE FRONTEND PERFORMANCE DIAGNOSIS AND REMEDIATION

(71) Applicant: U.S. Bank National Association, Minneapolis, MN (US)

(72) Inventors: Muthu Selvam, Huntersville, NC (US); Dinesh Kumar Nagarajan, Milton, GA (US); Meiyappan Lakshmanan, Marietta, GA (US)

(73) Assignee: U.S. Bank National Association

( * ) Notice: Subject to any disclaimer, the term of this patent is extended or adjusted under 35 U.S.C. 154(b) by 0 days.

(21) Appl. No.: 19/374,335

(22) Filed: Oct. 30, 2025

(51) Int. Cl.
| | |
|---|---|
| G06F 9/44 | (2018.01) |
| G06F 8/30 | (2018.01) |
| G06F 9/445 | (2018.01) |
| G06F 9/45 | (2006.01) |
| G06F 9/455 | (2018.01) |
| G06N 20/00 | (2019.01) |

(52) U.S. Cl.
CPC ............... G06F 8/30 (2013.01); G06N 20/00 (2019.01)

(58) Field of Classification Search
CPC ................................. G06F 8/30; G06N 20/00
See application file for complete search history.

(56) References Cited

U.S. PATENT DOCUMENTS

| | | | | |
|---|---|---|---|---|
| 11,876,858 | B1 * | 1/2024 | Nair .................... | H04L 67/1008 |
| 12,323,449 | B1 * | 6/2025 | Graves ...................... | G06F 8/75 |

| | | | | |
|---|---|---|---|---|
| 12,468,510 | B1 * | 11/2025 | Kuperman ................ | G06F 8/77 |
| 12,493,829 | B1 * | 12/2025 | Fedoruk .............. | G06F 21/6209 |
| 2019/0312800 | A1 * | 10/2019 | Schibler .................. | H04L 41/16 |
| 2023/0315747 | A1 * | 10/2023 | Arbatti .................. | G06F 16/182 707/769 |
| 2024/0106846 | A1 * | 3/2024 | Kapoor ................... | H04L 63/10 |
| 2024/0201967 | A1 * | 6/2024 | Pulle ................... | G06F 11/3409 |
| 2025/0173241 | A1 * | 5/2025 | Cirone ................ | G06F 11/3466 |
| 2026/0105438 | A1 * | 4/2026 | Cella ....................... | G06Q 20/36 |
| 2026/0106868 | A1 * | 4/2026 | Lakshminarayana ......................... H04L 63/0861 |
| 2026/0119305 | A1 * | 4/2026 | Rajendran ........... | G06F 11/0793 |

FOREIGN PATENT DOCUMENTS

| | | | | | |
|---|---|---|---|---|---|
| CN | 120371710 | A | * | 7/2025 | .......... G06F 18/2411 |
| JP | 2023551029 | A | * | 12/2003 | ........... G06N 3/0442 |

OTHER PUBLICATIONS

Yifan Liao, Detecting and Explaining Anomalies Caused by Web Tamper Attacks via Building Consistency-based Normality , 2024, pp. 1-13. https://ieeexplore.ieee.org/stamp/stamp.jsp?tp=&arnumber= 10765029 (Year: 2024).*

(Continued)

*Primary Examiner* — Mongbao Nguyen
(74) *Attorney, Agent, or Firm* — Garg Law Firm, PLLC; Rakesh Garg; Chris Ziolkowski

(57) ABSTRACT

In telemetry data received from telemetry code in a frontend code executing on a user device, an anomaly is detected corresponding to a performance metric of the frontend code. The anomaly is mapped to a portion of the frontend code as a root-cause of the anomaly. A code patch is generated; the code patch being configured to avoid the anomaly. In a memory of the user device, the frontend code is modified with the code patch, the modifying causing the modified frontend code to be rendered on the user device.

20 Claims, 11 Drawing Sheets

400

(56)            References Cited

OTHER PUBLICATIONS

Jialin Sui, Anomaly Detection for Telemetry Time Series Using a Denoising Diffusion Probabilistic Model, 2024, pp. 1-11. https://ieeexplore.ieee.org/stamp/stamp.jsp?tp=&arnumber=10494221 (Year: 2024).*

Mahsa Raeiszadeh, Real-Time Adaptive Anomaly Detection in Industrial IoT Environments, 2024, pp. 6839-6855. https://ieeexplore.ieee.org/stamp/stamp.jsp?tp=&arnumber=10643234 (Year: 2024).*

Medium, Front-End Performance Issues: Causes and Ways to Address Them with Frameworks and UI Libraries, 2024, pages https://dhtmlx.medium.com/front-end-performance-issues-causes-and-ways-to-address-them-with-frameworks-and-ui-libraries-72545ebfd83f (Year: 2024).*

Pallavi Zambare, Securing Agentic AI: Threat Modeling and Risk Analysis for Network monitoring agentic AI system, 2025, pp. 1-12. https://arxiv.org/pdf/2508.10043 (Year: 2025).*

Jian Yang, HG-PAD: Heterogeneous Graph Structure Learning Aided Performance Anomaly Diagnosis in Microservice Systems, Sep. 2025, pp. 2916-2929. https://ieeexplore.iee.org/stamp/stamp.jsp?tp=&arnumber=11142765 (Year: 2025).*

English Translation, Liao (CN 120371710 A), 2025, 1-23. (Year: 2025).*

English translation (JP 2023551029 A), 2023, pp. 1-22. (Year: 2023).*

MDN, PerformanceObserver, Oct. 17, 2025, https://developer.mozilla.org/en-US/docs/Web/API/PerformanceObserver.

Walton et al., Largest Contentful Paint (LCP), Sep. 4, 2025, https://web.dev/articles/lcp.

Walton , First Contentful Paint FLCP), Dec. 6, 2023, https://web.dev/articles/fcp.

Mihajlija et al., Cumulative Layout Shift (CLS), Apr. 12, 2023, https://web.dev/articles/cls.

Walton, Time to Interactive (TTI), Nov. 17, 2023, https://web.dev/articles/tti.

Kearney et al., Record heap snapshots, Feb. 9, 2024, https://developer.chrome.com/docs/devtools/memory-problems/heap-snapshots.

MDN, First Contentful Paint (FCP), Oct. 2025, https://developer.mozilla.org/docs/Glossary/First_contentful_paint.

MDN, Largest Contentful Paint (LCP), Oct. 2025, https://developer.mozilla.org/en-US/docs/Web/API/LargestContentfulPaint.

MDN, Cumulative Layout Shift (CLS), Oct. 2025, https://developer.mozilla.org/en-US/docs/Glossary/CLS.

Mdn, Time to Interactive (TTI), Oct. 2025, https://developer.mozilla.org/en-US/docs/Glossary/Time_to_interactive.

Brosset, Display the current framerate of your webpage, Mar. 3, 2023, https://devtoolstips.org/tips/en/display-current-framerate/.

MDN, Memory management, Oct. 2025, https://developer.mozilla.org/en-US/docs/Web/JavaScript/Guide/Memory_management.

MDN, Navigation and resource timings, Oct. 2025, https://developer.mozilla.org/en-US/docs/Web/Performance/Guides/Navigation_and_resource_timings.

MDN, PerformanceResource Timing, Oct. 2025, https://developer.mozilla.org/en-US/docs/Web/API/PerformanceResource Timing.

MDN, Resource timing, Oct. 2025, https://developer.mozilla.org/en-US/docs/Web/API/Performance_API/Resource_timing.

* cited by examiner

TELEMETRY COLLECTION
402

COMPARE WITH
HISTORICAL BASELINE

STATISTICAL BASELINE COMPARISON
404

FEED INTO ML MODEL

ML-BASED ANOMALY SCORING
406

SCORE > THRESHOLD

ANOMALY FLAGGING
408

ROUTE TO
MAPPING ENGINE

ROOT CAUSE MAPPING ENGINE
410

600

RULE-BASED ENGINE
RULE: IF CLS > 0.1 AND
<IMG> TAG LACKS WIDTH
AND HEIGHT ATTRIBUTES
→SUGGEST LAYOUT
STABILIZATION FIX
602

SIGNED
DEPLOYMENT
606

ML-BASED
CODE GENERATION
INPUT PROMPT PARAMETERS
OUTPUT CODE
604

PATCH
MANIFEST
608

DISAPPROVAL
ROLLBACK
610

*Fig. 7*
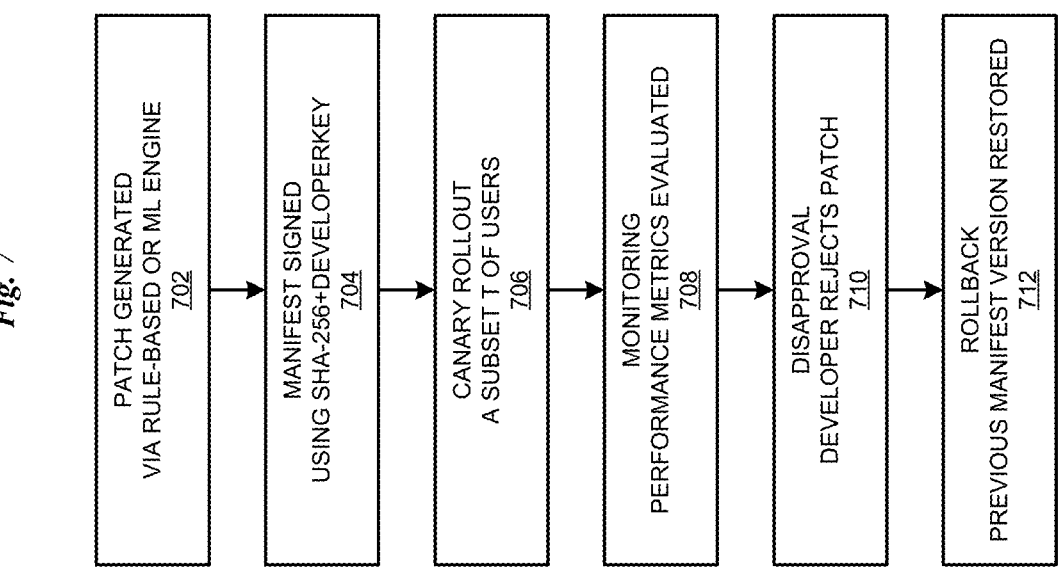
PATCH GENERATED
VIA RULE-BASED OR ML ENGINE
702
MANIFEST SIGNED
USING SHA-256+DEVELOPERKEY
704
CANARY ROLLOUT
A SUBSET T OF USERS
706
MONITORING
PERFORMANCE METRICS EVALUATED
708
DISAPPROVAL
DEVELOPER REJECTS PATCH
710
ROLLBACK
PREVIOUS MANIFEST VERSION RESTORED
712

*Fig. 10*
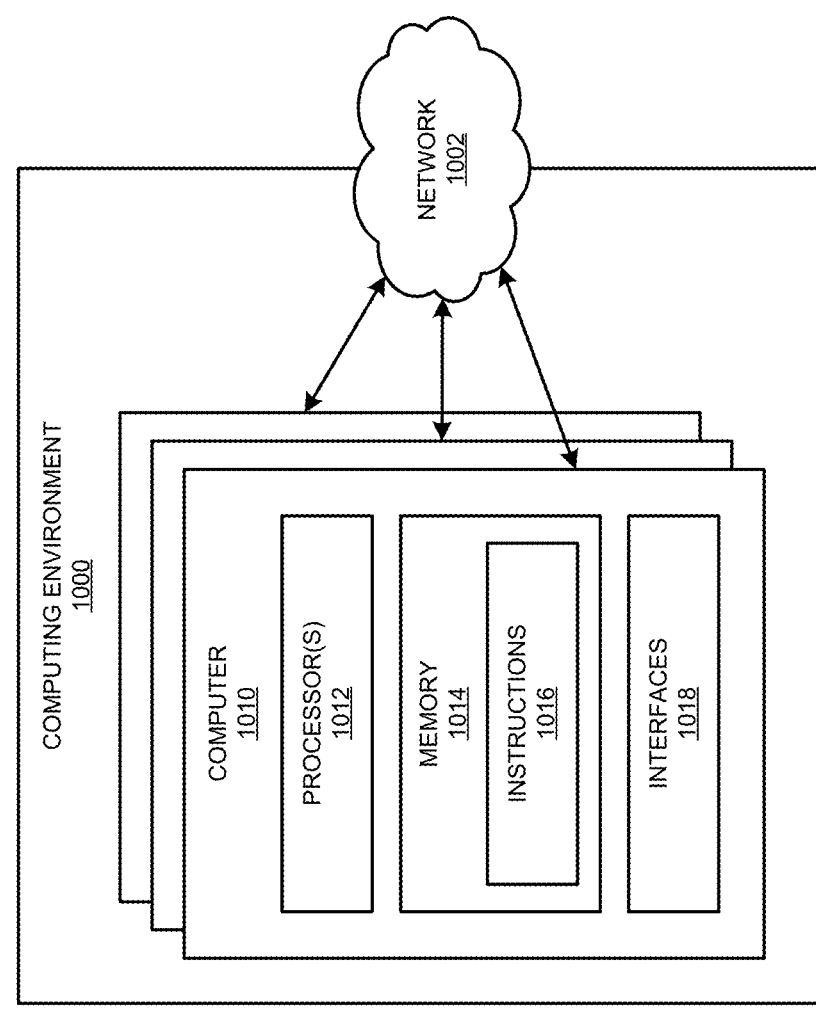

ADAPTIVE FRONTEND PERFORMANCE DIAGNOSIS AND REMEDIATION

BACKGROUND

In many modern information-technology systems, client functionality is delivered through a layered architecture that separates responsibilities between a frontend layer and a backend layer. The frontend, typically implemented in a web browser or a mobile application, is responsible for rendering the user interface (UI), managing state, and performing local validation. It communicates with the backend via a network protocol such as HTTP/HTTPS or WebSockets, requesting data or invoking services that the backend exposes.

The backend layer houses the business logic, data persistence, and integration with external services. It is commonly built on server-side frameworks that expose RESTful APIs or GraphQL endpoints, connect to data repositories such as relational or NoSQL databases, and implement authentication, authorization, and transaction management among other business specific functions. In addition, caching layers (e.g., Redis) and message queues (e.g., RabbitMQ) are often inserted to decouple services and improve responsiveness.

When a user initiates an action—such as logging in, loading a page, or submitting a form—the frontend serializes the request, adds any required authentication tokens, and dispatches the request over the network to the backend server. The backend processes the request, performs validation, accesses or updates persistent storage, and returns a structured payload, typically in JSON, back to the frontend. The frontend deserializes the payload, updates the UI, and may cache the data locally to reduce subsequent round-trips.

Network transport introduces several latency sources. Domain Name Service (DNS) resolution, Transmission Control Protocol (TCP) handshake, Transport Layer Security (TLS) negotiation, and server processing time all contribute to the perceived response time. In addition, packet loss or congestion can lead to retransmissions, further inflating the total round-trip time. Modern networks employ Content Delivery Networks (CDNs) to cache static assets close to the user, reducing distance and improving download speeds; however, dynamic data still depends on the latency of the application servers.

The illustrative embodiments recognize that performance problems frequently arise from the interaction between frontend rendering and backend response characteristics. On the frontend, excessive JavaScript execution, memory leaks, or continuous expensive re-renders can cause frame drops or layout instability, degrading the user experience. On the backend, sub-optimal query plans, blocking database locks, or inadequate caching can lengthen processing time, thereby increasing the overall latency experienced by the user. When the two tiers are not tightly orchestrated, a delay in one part propagates to the other, creating a feedback loop that exacerbates the user-visible slowdown.

Additionally, the illustrative embodiments further recognize that scalability constraints become visible under high load. As concurrent users increase, the backend may suffer from resource contention (CPU, memory, I/O), leading to queuing delays or outright timeouts. At the same time, the frontend may be overwhelmed by excessive data or poorly structured state, causing slow hydration or jank. The resulting performance bottlenecks thus stem not only from isolated components but from the coupling of latency, resource exhaustion, and inefficient rendering across the entire client-server continuum.

SUMMARY

The present disclosure includes inventive concepts relating generally to improving the performance of software applications, such as methods, systems, and computer programs for adaptive frontend performance diagnosis and remediation. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, a computer-implemented method embodiment includes detecting, in telemetry data received from telemetry code in a frontend code executing on a user device, an anomaly corresponding to a performance metric of the frontend code. The embodiment further includes mapping the anomaly to a portion of the frontend code as a root-cause of the anomaly. The embodiment further includes generating a code patch, the code patch configured to avoid the anomaly. The embodiment further includes modifying, in a memory of the user device, the frontend code with the code patch, the modifying causing the modified frontend code to be rendered on the user device.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

At least some novel features believed characteristic of examples of inventive concepts disclosed herein are set forth in the appended claims. The inventive concepts of the instant application, however, as well as a preferred mode of use, further objectives, and advantages thereof, will best be understood by reference to the following detailed description of the illustrative embodiments when read in conjunction with the accompanying drawings, wherein:

FIG. 7 depicts a patch deployment and monitoring process in accordance with an illustrative embodiment.

FIG. 10 depicts a data processing environment in which aspects of the present disclosure may be implemented.

DETAILED DESCRIPTION

Figure 1:
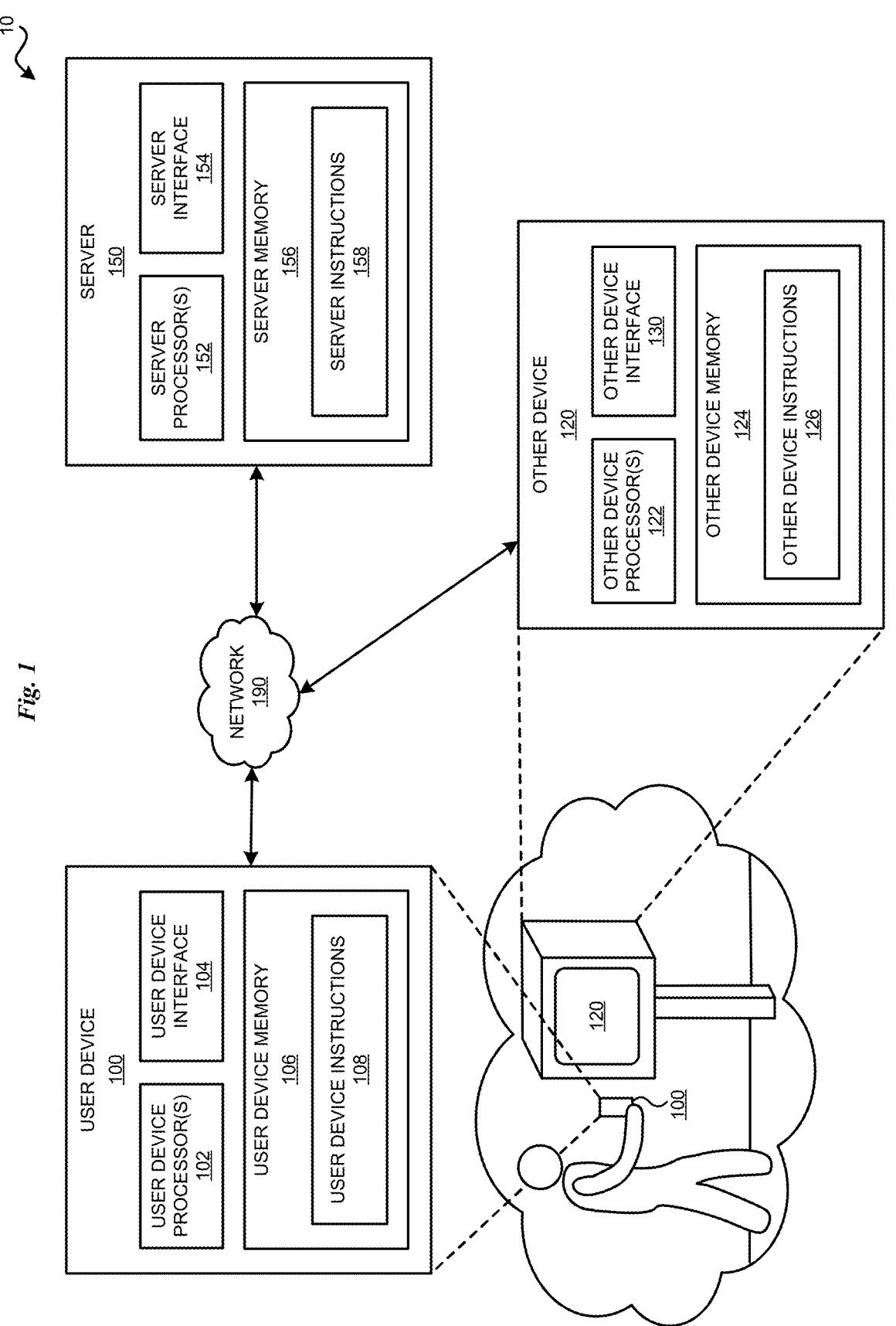
FIG. 1 depicts a block diagram of a computing environment in which an illustrative embodiment may be implemented.

The illustrative embodiments relate to software performance monitoring and automated remediation for web-based front-end applications, particularly those built with modern JavaScript frameworks such as REACT, ANGULAR, and VUE. The present disclosure concerns a system that captures rendering metrics from the browser, analyses these metrics for performance anomalies, maps anomalies to source-code components, and generates actionable remediation suggestions, including optional self-healing deployments.

The illustrative embodiments recognize that prior approaches to diagnosing front-end performance problems are primarily passive observability platforms such as LIGHTHOUSE, APPDYNAMICS, SPLUNK, and DATADOG. These systems and other similar techniques collect metrics through standard browser interfaces (e.g., via the PERFORMANCEOBSERVER API or similar instrumentation) and present aggregated dashboards. The illustrative embodiments recognize that they do not provide automated mapping of performance deviations to the location in the source code that caused them. The typical workflow for resolving performance issues presently involves a developer manually interpreting logs, correlating stack traces, and patching code. Recent efforts have explored machine-learning techniques, such as statistical baselines, isolation forests, DBSCAN, and Long Short-Term Memory (LSTM) networks, for detecting outliers in time-series telemetry. However, the illustrative embodiments recognize that these techniques remain disconnected from source-level context and do not offer remediation.

The illustrative embodiments recognize that these existing solutions suffer from considerable shortcomings. Passive reporting tools lack the ability to associate a performance anomaly with a specific front-end component or lifecycle event, making root-cause discovery labor-intensive. Because remediation is not automated, developers must manually modify source code, re-build, and redeploy, which delays resolution and increases the risk of introducing new regressions. Furthermore, these tools do not incorporate a learning loop that refines detection or patch generation based on developer feedback; consequently, the effectiveness of diagnosis and correction does not improve over time.

It is therefore desirable to provide an integrated, intelligent system that continuously monitors performance metrics, automatically identifies and localizes anomalies to the code level, generates code-patch suggestions, and incorporates developer responses to improve future diagnostic accuracy. Such a system would reduce debugging effort, accelerate resolution of performance regressions, and enable self-healing deployments of web-app clients.

The illustrative embodiments address these deficiencies and needs by providing a method, apparatus, system, and application for adaptive frontend performance diagnosis and remediation. The illustrative embodiments improve the present state of the art technology for performance of distributed or layered software applications, as described herein.

The following is a description of a specific example implementation of the proposed architecture according to one embodiment. The description of the implementation illustrates the principle of operation of the embodiment using certain example use cases, example data, and corresponding results from the proposed architecture. All trademarks related to any specifically named examples, uses, characters, entities, values, numbers, limits, tools, techniques, models, steps, and operations described or referenced herein belong to their respective owners. The specific examples, uses, characters, entities, values, numbers, limits, tools, techniques, models, steps, and operations are not intended to be limiting. From this disclosure, those of ordinary skill in the art will be able to conceive many other variations of these description artifacts and the same are contemplated within the scope of the illustrative embodiments. The description of the implementation is as follows—

Telemetry Collection Layer

The telemetry collection layer is a client-side instrumentation module that is injected into single-page applications built with modern JavaScript frameworks such as React, Angular, or Vue. By harnessing browser-native instrumentation APIs (for example, the PerformanceObserver interface, the Chrome DevTools protocol, and framework-specific lifecycle hooks), the layer captures real-time rendering metrics (e.g., frame-per-second, first contentful paint, largest contentful paint, cumulative layout shift, time to interactive, etc.), memory usage (e.g., heap snapshots and reflow traces), and network latency data. These and other similar metrics are accumulated in a buffer and streamed to monitoring components via a lightweight protocol such as WebSocket or HTTP/2. The breadth of captured metrics provides a high-resolution picture of the front-end's operational state, enabling precise detection of subtle performance regressions that are often invisible to end users.

In the example implementation, telemetry collection is performed by injecting instrumentation into the frontend application such that the system can capture granular performance metrics from the browser. The instrumented code is written for the React framework, but the same approach can be applied to other popular front-end frameworks such as Angular and Vue through equivalent lifecycle hooks. The injected code example shown below uses browser-native interfaces, notably the PerformanceObserver API, which allows a script to observe a specific set of performance entry types (paint events, layout shift events, long tasks, and resource loads) that are defined by the Web Performance Working Group.

```
import {useEffect} from 'react'
useEffect(( )=>{
const observer=new PerformanceObserver((list)>{
list.getEntries( ).forEach((entry)=>{
const telemetryData={
type: entry.entryType,
name: entry.name,
startTime: entry.startTime,
duration: entry.duration,
timestamp: performance.now( )
};
sendToTelemetryBuffer(telemetryData); // Custom func-
    tion to stream telemetry
});
});
observer.observe({
entryTypes: ['paint', 'layout-shift', 'longtask', 'resource']
});
```

```
return ( )=>{
observer.disconnect( );
};
}, [ ]);
```

The code is executed in the context of the web page, so it runs within the same JavaScript environment as the user-visible part of the application. The React example shows how the hook useEffect is used to register the PerformanceObserver on component mount and to deregister it on component unmount, thereby ensuring that the observer exists only while the component is active. The telemetry data is assembled into small JSON objects that capture the type of entry, the entry name, the start time, the duration, and a timestamp derived from performance.now( ). This telemetry payload is then sent to a telemetry buffer via a custom function called sendToTelemetryBuffer, which abstracts the transmission of the metrics to the server or to a streaming endpoint that feeds the anomaly detection engine. The observer is configured to watch the entry types 'paint', 'layout-shift', 'longtask', and 'resource'.

In an example detection, when a layout shift anomaly occurs, the system emits an "CLS" (Cumulative Layout Shift) event with a numerical score that represents the shift. The example JSON shown below captures the full set of fields that describe the layout-shift entry, including the total displacement score, start time, duration, and a timestamp.

```
{
"type": "layout-shift",
"name": "CLS",
"score": 0.35,
"startTime": 1423.5,
"duration": 0.25,
"timestamp": 1423.75
}
```

The system uses a simple numeric threshold to determine whether an event is anomalous: if the CLS score exceeds 0.10, the detection logic flags the event for further analysis. The detection logic paragraph explains that threshold is applied to the CLS score and that an anomaly flag is raised when the threshold is crossed, prompting the anomaly detection engine to process the event for root-cause mapping. The logic also indicates that the next step is to generate a remediation suggestion based on the severity of the anomaly.

Detection Logic. The example detection logic specifies that the CLS score is compared to a threshold value of 0.10. If the score is greater than the threshold, the system raises an anomaly flag. Once the anomaly flag is raised, the system hands the event off to the anomaly detection engine, which processes the event and passes it to the root-cause mapping engine for correlation with source code. The logic section also notes that the detection threshold can be tuned for specific applications based on observed baseline behavior, and that the engine can be configured to raise alerts or to log anomalies for later review.

Example telemetry elements collected: The telemetry collection layer records a wide set of metrics related to rendering and resource use, including, as some non-limiting examples, the first paint of the page (FCP—First Contentful Paint), the largest painted element (LCP—Largest Contentful Paint), cumulative layout shift (CLS—Cumulative Layout Shift), the time at which the page becomes interactive (TTI—Time to Interactive), and the frame-per-second (FPS—Frames Per Second). In addition to rendering metrics, the system collects memory usage information, notably JavaScript heap snapshots that provide a snapshot of all objects currently referenced by the application and can reveal memory leaks. The metric set also includes the timing of DNS resolution and the duration of individual network requests for images, scripts, and stylesheets, collected through the Resource Timing API; API latency is captured for calls to external services. The telemetry layer also captures the event of the DOM reflows and style recalculations that occur during layout, which are costly operations in web rendering. Finally, the component lifecycle events—mount and unmount for React components, Angular lifecycle hooks, and Vue watchers—are traced using custom hooks injected into the application's component constructors, offering a mechanism to correlate performance spikes with the exact phase of the component's life cycle that may be responsible for the observed anomaly.

Anomaly Detection Engine

The anomaly detection engine is a type of monitoring component that processes the telemetry stream in near real-time, applying a hybrid suite of statistical and machine-learning models. Moving-average and exponential weighted moving-average (EWMA) filters establish baseline expectations, while z-score calculations flag deviations. Unsupervised outlier techniques such as Isolation Forest and DBSCAN identify isolated spikes in latency or re-render counts. For sequential dependencies, an LSTM neural network predicts future metric values; large reconstruction errors signal a temporal anomaly. By combining multiple modalities, the engine reduces both false positives and false negatives, producing succinct anomaly reports that include severity and a brief description of the affected metric.

In the example implementation, the anomaly detection engine processes telemetry data in near real-time, applying a layered suite of statistical baseline detection, unsupervised machine-learning techniques, and neural sequence models to identify deviations in front-end performance metrics. The engine first computes moving-average baselines and Z-score thresholds for each metric, applying Holt-Winters forecasting to capture seasonality and trend within a rolling time window, and flags observations that fall outside predefined confidence bounds. It then passes the same telemetry to an Isolation Forest and DBSCAN clustering algorithm, which isolate outlier patterns regardless of prior distribution assumptions. Finally, the engine feeds sequences of feature vectors—composed of timing, memory, and rendering data—into an LSTM autoencoder, which reconstructs each sequence and returns an anomaly score; values exceeding a tunable threshold identify temporal anomalies that might otherwise evade statistical methods.

The detection logic within the engine operates on individual metric entries captured by the telemetry collection layer. For each telemetry sample, the logic evaluates whether the metric's instantaneous value violates a rule such as a cumulative layout shift (CLS) score exceeding 0.10 or a memory heap size consistently rising without garbage collection. It tracks these violations over consecutive samples and, when persistent thresholds are breached, generates an anomaly alert that includes the metric type, timestamp, value, and severity. The engine bundles these alerts into an anomaly report ready for root-cause mapping.

Example Detection

```
{
"metric": "LCP",
"baseline": {
"mean": 2.1,
"stdDev": 0.4
},
"currentValue": 3.2,
"zScore": 2.75,
```

"anomaly": true

}

Detection Logic LCP value exceeds baseline by 2.75 standard deviations→anomaly flagged.

The telemetry elements collected for anomaly detection include standard browser rendering metrics such as first contentful paint (FCP), which denotes the time until the first text or image for a page appears; largest contentful paint (LCP), the time until the largest text or image appears and constitutes the point of perceived load completion; cumulative layout shift (CLS), a numeric score that quantifies visual stability; and time-to-interactive (TTI), a latency metric that measures when a site becomes fully interactive. Additional raw signals such as frames per second (FPS), JavaScript heap snapshots, DNS lookup times, and network resource loading durations feed into the engine's statistical models.

Machine-Learning-Based Detection

The engine employs an LSTM autoencoder to model normal sequences of telemetry and detect anomalies. The model input is a sequence of timestamped feature vectors that include metrics such as FPS, heap usage, CLS score, and API latency for a window of 60 seconds, for example:

```
{
"sequence": [
{
"timestamp": 0,
"fps": 60,
"heap": 20
},
{
"timestamp": 1,
"fps": 58,
"heap": 22
}, . . .
{
"timestamp": 60,
"fps": 30,
"heap": 120
}
]
}
```

Model Output:

```
{
"anomalyScore": 0.92,
"threshold": 0.85,
"anomalyDetected": true
}
```

The LSTM autoencoder outputs an anomaly score that reflects reconstruction error; scores above a threshold of 0.85 flag the sequence as anomalous, which is then propagated to the root-cause mapping engine. The model was trained on a dataset composed of publicly available frontend repositories from GitHub, synthetic telemetry traces simulated for known performance regressions (e.g., layout shifts, memory leaks, and latency spikes), and labeled productions telemetry collected from real user sessions, with supervised learning used for classification and reinforcement learning employed to adjust patch effectiveness over time.

**Integration with Statistical Baselines

The anomaly detection pipeline first applies the moving-average, Z-score, and Holt-Winters models to each incoming metric; when thresholds are exceeded, an anomaly flag is raised and the telemetry vector is sent to the LSTM model for deeper validation. If the LSTM score confirms the anomaly, the engine outputs a detailed anomaly report that includes the metric, magnitude, and timestamp. These reports are then forwarded to the root-cause mapping engine for code-level correlation.

Training and Validation Data

The statistical baseline models use rolling windows, e.g., of 7 days or 30 days, depending on the metric seasonality, to compute historical mean and standard deviation. The LSTM model is trained on a balanced dataset of normal and anomalous sequences, curated from public codebases and synthetic simulations, and validated using cross-validation to ensure robust detection across diverse front-end frameworks. The training process involves minimizing reconstruction loss on normal sequences while maximizing the reconstruction error on anomalous sequences, followed by a fine-tuning phase that incorporates developer feedback from the validation loop.

The anomaly detection engine thus combines deterministic statistical filters, robust unsupervised clustering, and sequence-aware neural modeling to detect a broad spectrum of front-end performance regressions in real time, generating highly confident anomaly alerts that trigger root-cause mapping, remediation, and continuous learning throughout the system.

Root Cause Mapping Engine

Once an anomaly is identified, the root-cause mapping engine correlates the detected irregularity with the specific source-code unit that caused it. This is achieved through cross-reference of run-time stack traces with telemetry spikes, mapping framework-level lifecycle events (e.g., React render, Angular ngOnInit) to metric peaks, and applying static analysis on the source code's abstract syntax tree (AST). By weighting correlations using information-theoretic measures (mutual information) or explainability metrics (SHAP, SHapley Additive exPlanations), the engine generates a highly confident mapping between anomalous behavior and one or more code regions. The result is a root-cause report that pinpoints the exact component or module responsible for the degradation.

In the example implementation, Root-Cause Mapping Engine performs a multi-layered analysis that traces frontend performance anomalies back to the originating code components. The engine's process includes correlating telemetry spikes with runtime stack traces, mapping anomalous events to component lifecycle phases, parsing source code abstract syntax trees (ASTs), and performing runtime profiling to detect patterns such as repeated event listeners, missing memoization, or blocking API calls inside rendering code. For each anomaly the engine generates an internal mapping that identifies the specific component ID—such as React Fiber IDs or Angular Component IDs—and the exact source code region responsible for the issue, enabling precise remediation.

For example, when a memory leak is detected via telemetry—such as a continuously growing JavaScript heap without garbage collection—the system correlates this anomaly with runtime stack traces and lifecycle events. In one scenario the leak is traced to a DashboardChart component where an event listener (addEventListener) is attached during componentDidMount but never removed in componentWillUnmount, causing memory retention. Another scenario involves layout instability, where a high Cumulative Layout Shift (CLS) score is linked to an <img> tag rendered without explicit width and height attributes, leading to unexpected reflows. In latency-related anomalies, the engine detects that an API call is being made directly inside a render function, blocking the main thread and degrading responsiveness. By combining telemetry spikes, stack trace correlation, and static code analysis the engine isolates the exact source code region responsible for the anomaly and delivers actionable remediation.

Technical Example Scenarios: Scenario 1 Memory Leak involves telemetry showing heap usage grows continuously without garbage collection, stack trace pointing to the Dash-boardChart component, lifecycle mapping indicating an addEventListener call added in componentDidMount, AST analysis revealing the absence of a matching removeEventListener in componentWillUnmount, and mapped code displaying the relevant lifecycle functions with a snippet that adds a resize listener and an empty cleanup function—

```
componentDidMount( ) {
chart.addEventListener('resize', handleResize);
}
componentWillUnmount( ) {
chart.removeEventListener('resize', handleResize);
}
```

Scenario 2:

Mapped Code:

```
const userData=fetch('/api/user'); // inside render
```

Fix:

```
useEffect(( )=>{
fetch('/api/user').then(setUserData);
}, [ ]);
```

Latency Spike involves telemetry indicating an API latency of 1200 milliseconds against a baseline of 300 milliseconds, stack trace targeting the UserProfileCard component, AST parsing uncovering an API call placed inside a render function, mapped code consisting of a fetch call inside the render function, and a suggested fix that moves the fetch into a useEffect hook that executes only once.

Mapping techniques used include correlating stack traces to match telemetry spikes with runtime call stacks, linking anomalies to mount/unmount/render phases through life-cycle event mapping, using AST parsing to identify prob-lematic patterns such as repeated listeners or missing memo-ization, and employing instrumentation tags that embed component identifiers to trace anomalies to specific UI elements.

Remediation Engine

The remediation engine translates a root-cause report into developer-usable recommendations and machine-generated code patches. A rule-based subsystem first attempts to apply well-known optimizations (lazy loading of images, memo-izing expensive React components, relocating API calls to Web Workers). If no rule applies, a transformer model trained with a variety of code-generation repositories per-forms code synthesis, producing a minimal patch that addresses the identified problem while preserving existing semantics. The engine outputs a natural-language recom-mendation together with a diff (differential code patch) ready for an automatic pull-request or for inclusion in a developer-signed manifest for runtime hot-patching. Using the signed manifest mechanism, developers can verify and authorize or not authorize the patch, enabling automated deployment while retaining human oversight.

The remediation (recommendation) phase of the system addresses identified performance anomalies using both rule-based logic and machine-learning-assisted code generation. The system defines a rule in the Rule-Based Engine (RBE) that states if the cumulative layout shift (CLS) score, a numeric measurement of visual instability during page ren-dering, exceeds 0.1 and an <img> tag lacks explicit width and height attributes, the system should recommend a lay-out-stabilization fix; this rule leverages CLS thresholds that are derived from Lighthouse guidelines. In parallel, the ML-Based Code Generation component receives a struc-tured prompt that aggregates telemetry data, component context, and code patterns; in one illustrative example the input prompt includes component name, the issue at hand, the lifecycle framework, and telemetry trends, and the model outputs a React useEffect hook that attaches an event listener and provides a cleanup return function to remove the lis-tener, thereby resolving a detected memory leak. The gen-erated patch code is encapsulated in a patch manifest that contains metadata, such as the component identifier, patch code, telemetry context, and a version identifier; the mani-fest is cryptographically signed using an SHA-256 hash of its contents, signed by the developer's private key or a CI/CD signing certificate to certify authenticity and prevent tampering. The signed patch is first deployed to a canary user subset where its impact on performance metrics—such as a reduction in CLS or improved loading times—is moni-tored; if the developer approves the suggested patch, the system integrates it into the deployment pipeline and applies the patch to the broader production user base; if disapproval occurs or telemetry indicates a regression, the system rolls back to the previous manifest version, restoring the original code or removing the dynamic hot reload via an unmount operation, thus ensuring safe and reversible remediation.

In the example implementation, Rule Definition:

Rule: If CLS>0.1 and <img> tag lacks width and height attributes→suggest layout stabilization fix.

Before (Problematic Code)

```
img src="banner.jpg" />
```

After (Recommended Fix)

```
img src="banner.jpg width=600
heinght=400">
```

ML-Based Code Generation:

Input Prompt Parameters:

```
{
"component": "DashboardChart",
"issue": "Memory leak due to missing cleanup",
"context": "React lifecycle",
"telemetry": {
"heapGrowth": "continuous",
"duration": "120 s"
}
}
```

Output Code:

```
useEffect(( )=>{
chart.addEventListener('resize', handleResize)
return ( )=>chart.removeEventListener('resize', han-
dleResize)
}, [ ])
```

Feedback Loop

The feedback loop captures the developer's acceptance or rejection of suggested patches and feeds this information back into the learning pipeline. Each decision is logged along with the associated anomaly and root-cause data, forming a labeled dataset. Periodic retraining of the anomaly detection and patch generation models incorporates this feedback, adjusting thresholds and refining synthesis strat-egies. This continuous learning cycle ensures that the system adapts to evolving application code, changing performance baselines, and the specific preferences of the development team.

The Continuous-Learning Feedback Loop is designed to evolve the remediation engine's intelligence over time. While developer approval or disapproval of suggested patches is a primary training signal, the system also learns from several other contextual data sources. These include post-remediation performance improvements (e.g., reduced CLS or latency), regression detection during CI/CD builds, and user engagement metrics such as bounce rate or time-on-page. For example, if a patch is accepted and leads to a measurable drop in layout shift across sessions, that outcome reinforces the model's confidence in similar future recommendations. Conversely, if a patch is rejected or causes a regression, the model is penalized and retrained with alternate patterns. This multi-dimensional feedback loop ensures that the system doesn't just learn from binary developer responses but also adapts based on real-world impact and telemetry outcomes, making it increasingly precise and context-aware over time.

CI/CD Integration Module

A Continuous Integration and Continuous Deployment (CI/CD) pipeline is an automated process that builds, tests, and deploys software changes to ensure high-quality code is delivered frequently and reliably. The CI/CD integration module extends anomaly detection into the build pipeline. By analyzing telemetry collected during unit or integration tests, the module can identify regressions before a deployment is finalized. Test runs that exceed established performance thresholds trigger the anomaly detection workflow, generating remediation suggestions that can be automatically merged (subject to code-review constraints) or flagged for manual review. This pre-flight check prevents regression of performance-critical metrics and aligns the continuous integration process with the same intelligence that powers runtime monitoring.

In the example implementation, the system supports runtime patching of frontend performance issues through a self-healing execution mode, which does not require a full rebuild or redeployment of the frontend application. Client-Side Remediation (Self-Healing) consists of a JavaScript agent embedded in the frontend app that downloads a signed remediation manifest; the manifest contains patch metadata, the target component ID, a suggested code fix, and a cryptographic signature for verification, and the patch is applied dynamically using techniques such as: import('/patches/fix-layout.js').then(applyPatch); which allows hot code insertion directly on the client without any server-side rebuild.

During build time, Server-Side CI/CD Integration analyzes telemetry from previous deployments, detects regressions, generates patch suggestions, embeds signed manifests into build artifacts, and if approved, patches are automatically deployed with the release cycle. Patch Generation occurs as the rule-based or machine learning engine produces the patch code; the manifest is then signed by using SHA-256 hashing in combination with a developer key; the signed manifest is rolled out to a subset of users in a canary deployment where performance metrics are monitored; if a developer rejects the patch or telemetry indicates regression, the system rolls back to the previous manifest version, restoring the application to its prior state.

End of example implementation description.

FIG. 1 depicts a block diagram of a computing environment in which an illustrative embodiment may be implemented. The computing environment, labeled and referred to as system 10, includes user device 100, other device 120, and server 170 connected to a network. System 10 is configured to load and execute at least some of the computer code involved in performing the inventive methods, such as server instructions 158, which include the server-side computer program instructions of an embodiment, user device instructions 108, which include the user device-side computer program instructions of an embodiment, and other device instructions 126, which include the other device-side computer program instructions of an embodiment, as may be needed to perform the dynamic adaptation of identity related user interface.

User device 100 is a device used by a user that can be used as part of processes described herein. User device 100 can include one or more aspects described elsewhere herein such as in reference to computing environment 1000 of FIG. 10. In many examples, user device 100 is a personal computing device, such as a smart phone, tablet, laptop computer, or desktop computer. But device 100 need not be so limited and may instead encompass other devices used by a user as part of processes described herein. In the illustrated example, user device 100 can include one or more user device processors 102, one or more user device interfaces 104, and user device memory 106, among other components.

The one or more user device processors 102 are one or more components of user device 100 that execute instructions, such as instructions that obtain data, process the data, and provide output based on the processing. The one or more user device processors 102 can include one or more aspects described below in relation to the one or more processors 1012 of FIG. 10.

The one or more user device interfaces 104 are one or more components of user device 100 that facilitate receiving input from and providing output to something external to user device 100. The one or more user device interfaces 104 can include one or more aspects described below in relation to the one or more interfaces 1018 of FIG. 10.

User device memory 106 is a collection of one or more components of user device 100 configured to store instructions and data for later retrieval and use. User device memory 106 can include one or more aspects described below in relation to memory 1014 of FIG. 10. As illustrated, user device memory 106 stores user device instructions 108 and other suitable user device code.

User device instructions 108 are a set of instructions that, when executed by one or more of the one or more user device processors 102, cause the one or more user device processors 102 to perform an operation described herein. In examples, instructions 108 can be those of a mobile application (e.g., that may be obtained from a mobile application store, such as the APPLE APP STORE or the GOOGLE PLAY STORE). The mobile application can provide a user interface for receiving user input from a user and acting in response thereto. User interface 104 can further provide output to the user. In some examples, client instructions 108 are instructions that cause a web browser of user device 100 to render a web page associated with a process described herein. The web page may present information to the user and be configured to receive input from the user and take actions in response thereto.

Other device 120 may be a self-service kiosk, a computer terminal, a dedicated transactions terminal—such as an electronic payment terminal, an automated customer interaction machine or device—such as an Automated Teller Machine (ATM), and the like.

In the illustrated example, other device 120 includes one or more other device processors 122, other device memory 124, and other device interface 130.

The one or more other device processors 122 are one or more components of other device 120 that execute instructions, such as instructions that obtain data, process the data, and provide output based on the processing. The one or more other device processors 122 can include one or more aspects described below in relation to the one or more processors 1012 of FIG. 10.

Other device memory 124 is a collection of one or more components of other device 120 configured to store instructions and data for later retrieval and use. Other device memory 120 can include one or more aspects described below in relation to memory 1014 of FIG. 10. Other device memory 120 can store other device instructions 126.

Other device instructions 126 are instructions that, when executed by the one or more processors 122, cause the one or more processors 122 to perform one or more operations described elsewhere herein.

The one or more other device interfaces 130 are one or more components of other device 120 that facilitate receiving input from and providing output to something external to other device 120. The one or more other device interfaces 130 can include one or more aspects described below in relation to the one or more interfaces 1018 of FIG. 10.

Server 150 is a server device that functions as part of one or more processes described herein. In the illustrated example, server 150 includes one or more server processors 152, one or more server interfaces 154, and server memory 150, among other components.

The one or more server processors 152 are one or more components of server 150 that execute instructions, such as instructions that obtain data, process the data, and provide output based on the processing. The one or more server processors 152 can include one or more aspects described below in relation to the one or more processors 1012 of FIG. 10.

The one or more server interfaces 154 are one or more components of server 150 that facilitate receiving input from and providing output to something external to server 150. The one or more server interfaces 154 can include one or more aspects described below in relation to the one or more interfaces 1018 of FIG. 10.

Server memory 150 is a collection of one or more components of server 150 configured to store instructions and data for later retrieval and use. Server memory 150 can include one or more aspects described below in relation to memory 1014 of FIG. 10. Server memory 150 can store server instructions 158.

Server instructions 158 are instructions that, when executed by the one or more processors 152, cause the one or more processors 152 to perform one or more operations described elsewhere herein.

Network 190 is a set of devices that facilitate communication from a sender to a destination, such as by implementing communication protocols. Example networks 190 include local area networks, wide area networks, intranets, and the Internet.

Figure 2:
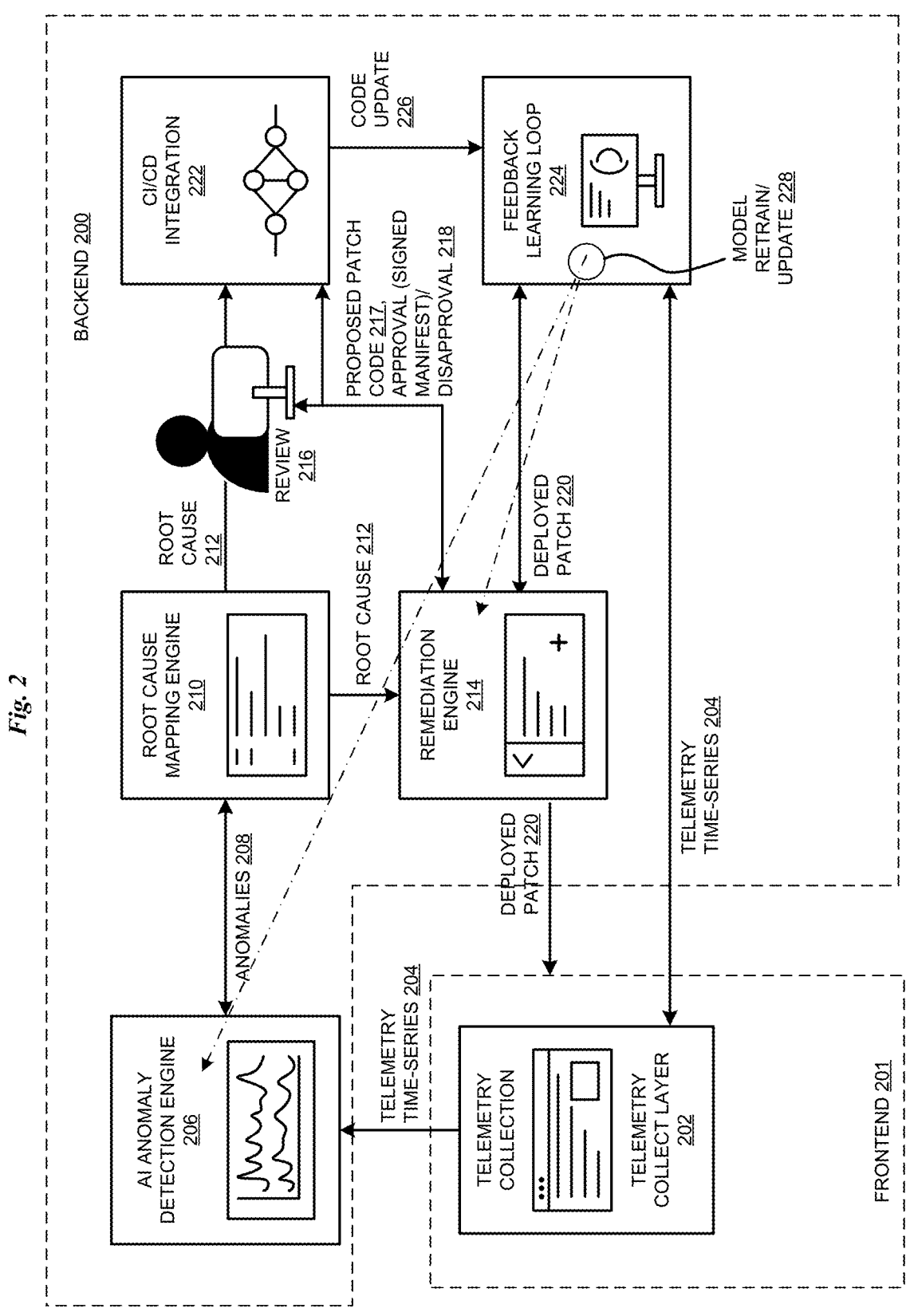
FIG. 2 depicts a system for anomaly detection and remediation in accordance with an illustrative embodiment.

FIG. 2 depicts a system for anomaly detection and remediation in accordance with an illustrative embodiment. Backend configuration 200 can be implemented as server instructions 158 in FIG. 1. Frontend configuration 201 can be implemented as user device instructions 108, or other device instructions 126 in FIG. 1. Backend 200 orchestrates monitoring, detection, root-cause mapping, remediation, and feedback for frontend 201 performance issues in accordance with an illustrative embodiment.

Backend 200 receives telemetry streams from telemetry collection layer 202 as telemetry time-series 204 into AI anomaly detection engine 206. AI anomaly detection engine 206 applies statistical baselines, unsupervised clustering, and LSTM neural models to identify performance anomalies and produces anomalies 208 containing type, magnitude, severity, and any other parameter that may be extractable from the telemetry. AI anomaly detection engine 206 routes anomalies 208 to root cause mapping engine 210, which correlates anomalies such as telemetry spikes with code execution data such as stack traces, lifecycle events, and AST analysis to identify root cause 212. Root cause 212 may be a specific code component responsible for the anomaly.

Root cause mapping engine 210 sends root cause 212, and optionally the associated telemetry, to remediation engine 214, human reviewer 216, or both. Remediation engine 214 applies rule-based logic, a trained code generation large-language model, or a combination thereof, to generate code patches 217. Remediation engine 214 may send code 217 of a proposed patch for human review 214 as a package recommendation. The human reviewer, e.g., a developer, 214, may approve or disapprove 218 the patch, e.g., indicating acceptance of the patch by signing a package manifest, or indicating a rejection by not signing the manifest.

Upon acceptance by review 216, or by an auto deployment mechanism, such as CI/CD integration component 222, remediation engine 214 deploys the patch as deployed patch 220 to frontend 201. Remediation engine 214 may interact with CI/CD integration component 222 in a similar manner using patch 217 and a suitable manner of integrating approved patch 217 into deployed code. For example, CI/CD integration 222 may receive an approved patch, integrate the patch into the release pipeline, and monitor regression during build and canary deployment before full rollout. This continuous cycle ensures real-time monitoring, detection, root-cause localization, automated remediation, and iterated learning.

Feedback learning loop component 224 uses the deployed patch 220, code update 226, and other available data such as anomalies 208 and approval/disapproval 218, to create labeled dataset for retraining or updating model parameters in the model used in anomaly detection engine 206, model used in remediation engine 214, or both. By incorporating developer decisions and performance outcomes, retraining AI anomaly detection engine 206 and/or remediation engine 214 ensures that the system as a whole is adapting to changing circumstances of frontend performance.

Figure 3:
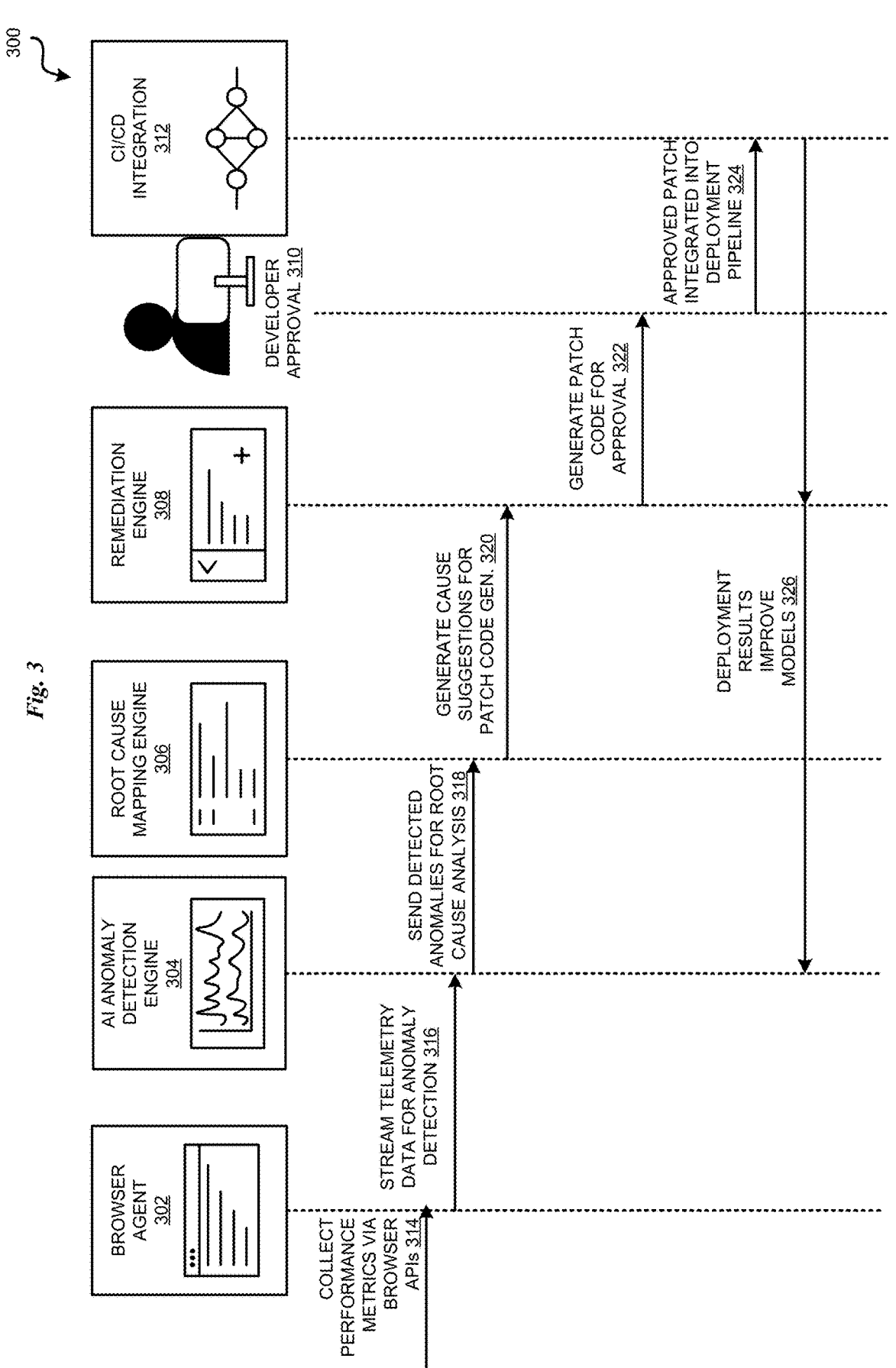
FIG. 3 depicts an integrated anomaly detection and remediation workflow in accordance with an illustrative embodiment.

FIG. 3 depicts an integrated anomaly detection and remediation workflow in accordance with an illustrative embodiment. Workflow 300 includes browser agent 302, AI anomaly detection engine 304, root cause mapping engine 306, remediation engine 308, developer or approver 310, and CI/CD integration 312. Each block corresponds to a similarly labeled artifact in FIG. 2.

browser agent 302 collects performance metrics via browser APIs (314) and streams telemetry data for anomaly detection (316). AI anomaly detection engine 304 sends the detected anomalies to root cause mapping engine 306 for root cause analysis (318). root cause mapping engine 306 generates one or more cause suggestions corresponding to an anomaly for generating patch code (320). Remediation engine 308 generates patch code 322 and optionally sends for approval. A patch may be auto approved, auto deployed, auto rejected, based on a rule or policy within the scope of the illustrative embodiments.

Developer approval process 310 approves patch code 322. CI/CD integration 312 integrates approved patch 322 into deployment pipeline (324). A deployed patch and the corresponding anomaly, patch code, approval criteria, improvements in frontend performance observed from the patch deployment, or a combination thereof, form the deployment results. The deployment results are then used by a feedback process (not shown) to improve one or more models in the configuration (326). The process either ends thereafter or continues for another iteration in this manner.

Figure 4:
FIG. 4 depicts an anomaly detection and mapping process in accordance with an illustrative embodiment.
Figure 4:
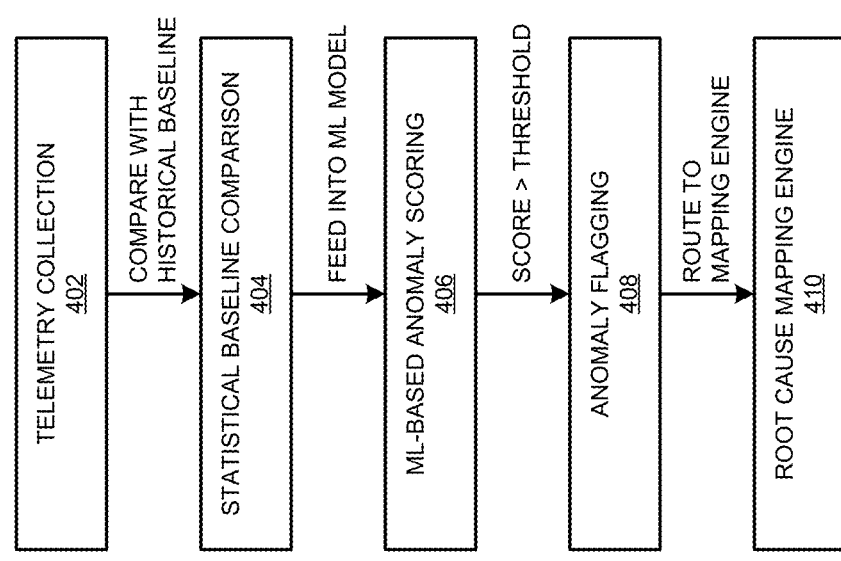

FIG. 4 depicts an anomaly detection and mapping process in accordance with an illustrative embodiment. Telemetry collection 402 gathers data from various sources. Statistical baseline comparison 404 compares the collected telemetry with historical baseline data to identify deviations. ML-based anomaly scoring 406 processes the deviations using a machine learning model to score the anomalies. Anomaly flagging 408 flags anomalies that exceed a predefined threshold score. Root cause mapping engine 410 routes flagged anomalies to a mapping engine for further analysis.

Figure 5:
FIG. 5 depicts a root cause analysis process in accordance with an illustrative embodiment.
Figure 5:
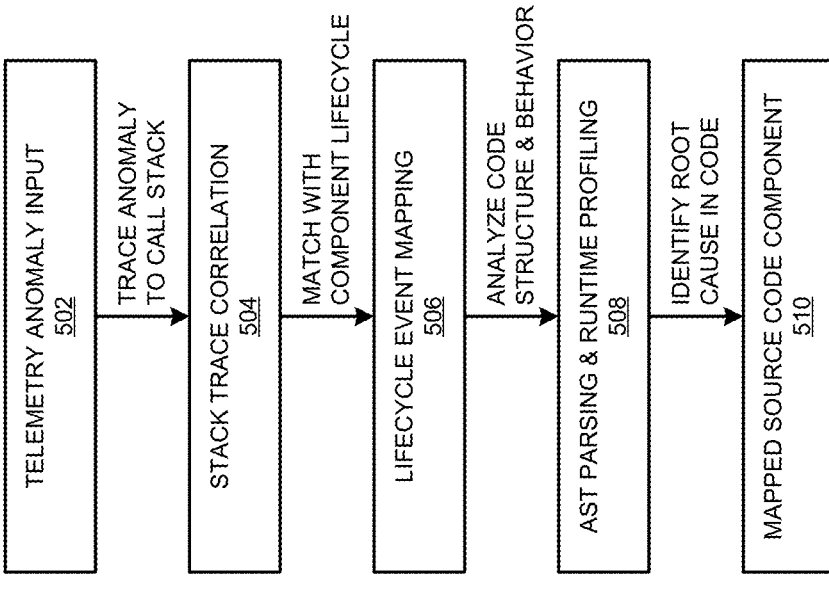

FIG. 5 depicts a root cause analysis process in accordance with an illustrative embodiment. Telemetry anomaly input 502 receives flagged anomalies from the previous process. Stack trace correlation 504 traces the anomalies to the corresponding call stack. Lifecycle event mapping 506 matches the traced anomalies with the component lifecycle events. AST parsing and runtime profiling 508 analyzes the code structure and behavior to identify the root cause. Mapped source code component 510 maps the identified root cause to the specific source code component.

Figure 6:
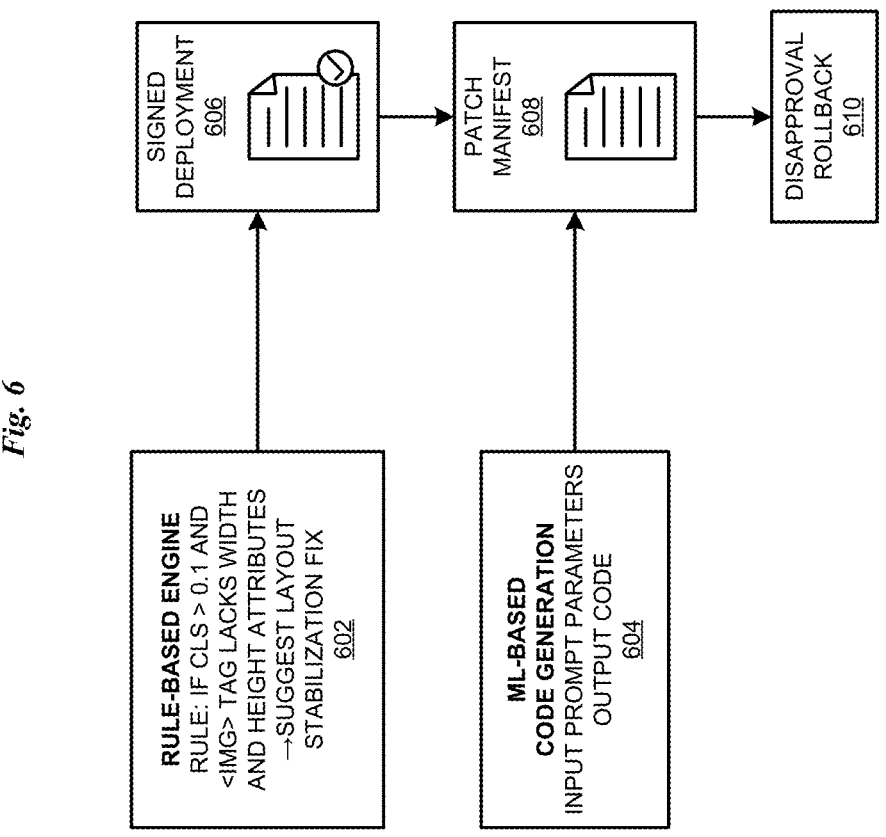
FIG. 6 depicts a code remediation process in accordance with an illustrative embodiment.

FIG. 6 depicts a code remediation process in accordance with an illustrative embodiment. Rule-based engine 602 applies predefined rules to suggest fixes for identified issues. ML-based code generation 604 generates code based on input prompt parameters using machine learning techniques. Signed deployment 606 deploys the generated code after signing it. Patch manifest 608 creates a manifest for the deployed patch. Disapproval rollback 610 rolls back the patch if disapproved.

FIG. 7 depicts a patch deployment and monitoring process in accordance with an illustrative embodiment. A patch is generated 702 via rule-based or ML engine. A manifest signer signs the patch manifest, e.g., using SHA-256+ developerkey, 704. Canary rollout 706 deploys the patch to a subset of users for testing. Monitoring 708 monitors and evaluates the performance metrics of the deployed patch. Disapproval 710 allows a developer to reject the patch if necessary. Rollback 712 restores the previous version of the manifest in case of disapproval.

Figure 8:
FIG. 8 depicts a telemetry-based anomaly detection and remediation process in accordance with an illustrative embodiment.
Figure 8:
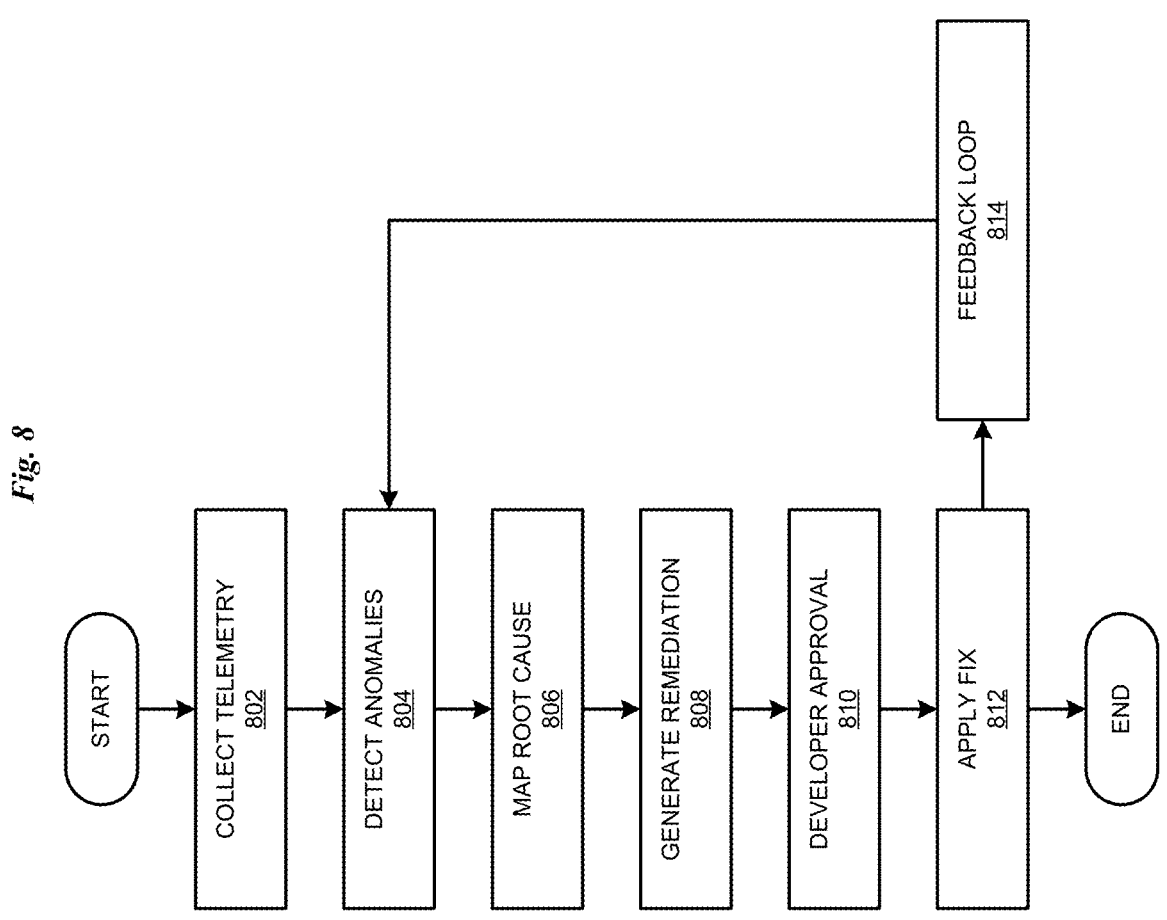

FIG. 8 depicts a telemetry-based anomaly detection and remediation process in accordance with an illustrative embodiment. Collect telemetry 802 gathers data from various sources. Detect anomalies 804 identifies anomalies in the collected telemetry. Map root cause 806 analyzes the anomalies to determine the root cause. Generate remediation 808 creates a remediation plan based on the root cause analysis. Developer approval 810 seeks approval from developers for the remediation plan. Apply fix 812 implements the approved remediation plan. Feedback loop 814 collects feedback on the applied fix to improve future processes.

Figure 9:
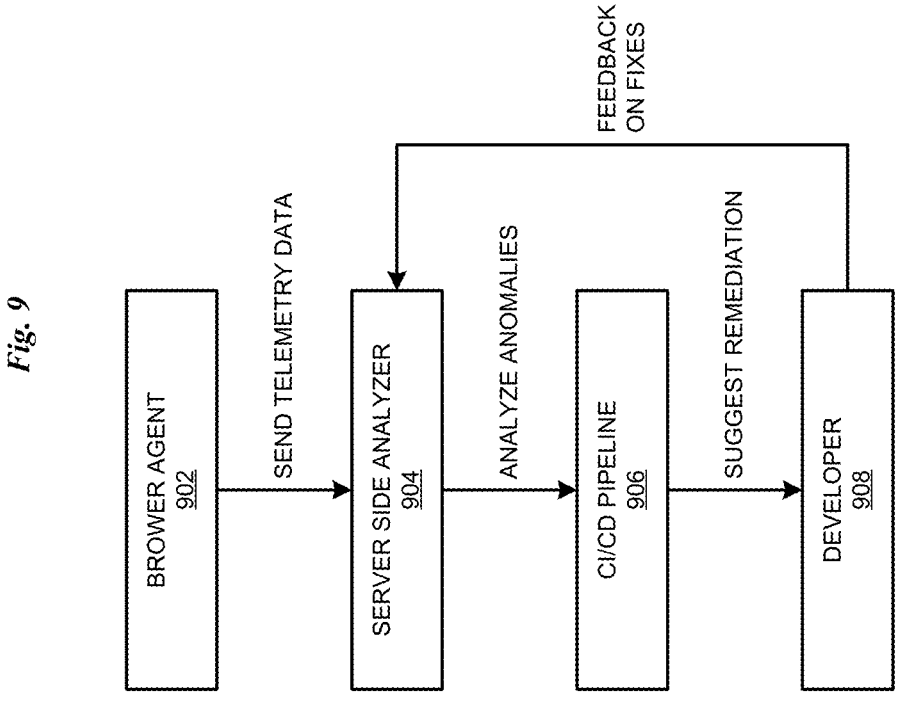
FIG. 9 depicts a CI/CD pipeline in accordance with an illustrative embodiment.

FIG. 9 depicts a CI/CD pipeline in accordance with an illustrative embodiment. Browser agent 902 sends telemetry data to the server side analyzer. Server side analyzer 904 analyzes the received telemetry data to identify anomalies. CI/CD pipeline 906 suggests remediation for the identified anomalies and provides feedback on the fixes. Developer 908 reviews the suggested remediation and feedback to make necessary adjustments.

FIG. 10 depicts a data processing environment 20 in which aspects of the present disclosure may be implemented. Computing environment 1000 is a set of one or more virtual or physical computers 1010 that individually or in cooperation achieve tasks, such as implementing one or more aspects described herein. Computers 1010 have components that cooperate to cause output based on input. Example computers 1010 include desktops, servers, mobile devices (e.g., smart phones and laptops), wearables, virtual reality devices, augmented reality devices, expanded reality devices, spatial computing devices, virtualized devices, other computers, or combinations thereof. In particular example implementations, computing environment 1000 includes at least one physical computer.

Computing environment 1000 may specifically be used to implement one or more aspects described herein. In some examples, one or more of computers 1010 may be implemented as a user device, such as mobile device and others of computers 1010 may be used to implement aspects of a machine learning framework useable to train and deploy models exposed to the mobile device or provide other functionality, such as through exposed application programming interfaces.

Computing environment 1000 can be arranged in any of a variety of ways. Computers 1010 can be local to or remote from other computers 1010 of environment 1000. Computing environment 1000 can include computers 1010 arranged according to client-server models, peer-to-peer models, edge computing models, other models, or combinations thereof.

In many examples, computers 1010 are communicatively coupled with devices internal or external to computing environment 1000 via network 1002. Network 1002 is a set of devices that facilitate communication from a sender to a destination, such as by implementing communication protocols. Example networks 1002 include local area networks, wide area networks, intranets, or the Internet.

In some implementations, computers 1010 can be general-purpose computing devices (e.g., consumer computing devices). In some instances, via hardware or software configuration, computers 1010 can be special purpose computing devices, such as servers able to practically handle large amounts of client traffic, machine learning devices able to practically train machine learning models, data stores able to practically store and respond to requests for large amounts of data, other special purposes computers, or combinations thereof. The relative differences in capabilities of different kinds of computing devices can result in certain devices specializing in certain tasks. For instance, a machine learning model may be trained on a powerful computing device and then stored on a relatively lower powered device for use.

Many example computers 1010 include one or more processors 1012, memory 1014, and one or more interfaces 1018. Such components can be virtual, physical, or combinations thereof.

The one or more processors 1012 are components that execute instructions, such as instructions that obtain data, process the data, and provide output based on the processing. The one or more processors 1012 often obtain instructions and data stored in memory 1014. The one or more processors 1012 can take any of a variety of forms, such as central processing units, graphics processing units, coprocessors, tensor processing units, artificial intelligence accelerators, microcontrollers, microprocessors, application-specific integrated circuits, field programmable gate arrays, other processors, or combinations thereof. In example implementations, the one or more processors 1012 include at least one physical processor implemented as an electrical circuit. Example providers of processors 1012 include INTEL, AMD, QUALCOMM, TEXAS INSTRUMENTS, and APPLE.

Memory 1014 is a collection of components configured to store instructions 1016 and data for later retrieval and use. Instructions 1016 can, when executed by the one or more processors 1012, cause execution of one or more operations that implement aspects described herein. In many examples, memory 1014 is a non-transitory computer readable medium, such as random-access memory, read only memory, cache memory, registers, portable memory (e.g., enclosed drives or optical disks), mass storage devices, hard drives, solid state drives, other kinds of memory, or combinations thereof. In certain circumstances, transitory memory 1014 can store information encoded in transient signals.

The one or more interfaces 1018 are components that facilitate receiving input from and providing output to something external to computer 1010, such as visual output components (e.g., displays or lights), audio output components (e.g., speakers), haptic output components (e.g., vibratory components), visual input components (e.g., cameras), auditory input components (e.g., microphones), haptic input components (e.g., touch or vibration sensitive components), motion input components (e.g., mice, gesture controllers, finger trackers, eye trackers, or movement sensors), buttons (e.g., keyboards or mouse buttons), position sensors (e.g., terrestrial or satellite-based position sensors such as those using the Global Positioning System), other input components, or combinations thereof (e.g., a touch sensitive display). The one or more interfaces 1018 can include components for sending or receiving data from other computing environments or electronic devices, such as one or more wired connections (e.g., Universal Serial Bus connections, THUNDERBOLT connections, ETHERNET connections, serial ports, or parallel ports) or wireless connections (e.g., via components configured to communicate via radiofrequency signals, such as according to WI-FI, cellular, BLUETOOTH, ZIGBEE, or other protocols). One or more of the one or more interfaces 1018 can facilitate connection of computing environment 1000 to network 1090.

Computers 1010 can include any of a variety of other components to facilitate performance of operations described herein. Example components include one or more power units (e.g., batteries, capacitors, power harvesters, or power supplies) that provide operational power, one or more busses to provide intra-device communication, one or more cases or housings to encase one or more components, other components, or combinations thereof.

A person of skill in the art, having benefit of this disclosure, may recognize various ways for implementing technology described herein, such as by using any of a variety of programming languages (e.g., a C-family programming language, PYTHON, JAVA, RUST, HASKELL, other languages, or combinations thereof), libraries or packages (e.g., that provide functions for obtaining, processing, and presenting data, such as may be obtained using a package manager like PIP or CONDA), compilers, and interpreters to implement aspects described herein. Example libraries include NLTK (Natural Language Toolkit) by Team NLTK (providing natural language functionality), PYTORCH by META (providing machine learning functionality), NUMPY by the NUMPY Developers (providing mathematical functions), and BOOST by the Boost Community (providing various data structures and functions) among others. Operating systems (e.g., WINDOWS, LINUX, MACOS, IOS, and ANDROID) may provide their own libraries or application programming interfaces useful for implementing aspects described herein, including user interfaces and interacting with hardware or software components. Web applications can also be used, such as those implemented using JAVASCRIPT or another language. A person of skill in the art, with the benefit of the disclosure herein, can use programming tools to assist in the creation of software or hardware to achieve techniques described herein, such as intelligent code completion tools (e.g., INTELLISENSE) and artificial intelligence tools (e.g., GITHUB COPILOT by MICROSOFT or CODE LLAMA by META).

In some examples, large language models can be used to understand natural language, generate natural language, or perform other tasks. Examples of such large language models include CHATGPT by OPENAI, a LLAMA model by META, a CLAUDE model by ANTHROPIC, others, or combinations thereof. Such models can be fine-tuned on relevant data using any of a variety of techniques to improve the accuracy and usefulness of the answers. The models can be run locally on server or client devices or accessed via an application programming interface. Some of those models or services provided by entities responsible for the models may include other features, such as speech-to-text features, text-to-speech, image analysis, research features, and other features, which may also be used as applicable.

Figure 11:
FIG. 11 depicts a configuration for machine learning in which aspects of the present disclosure may be implemented.
Figure 11:
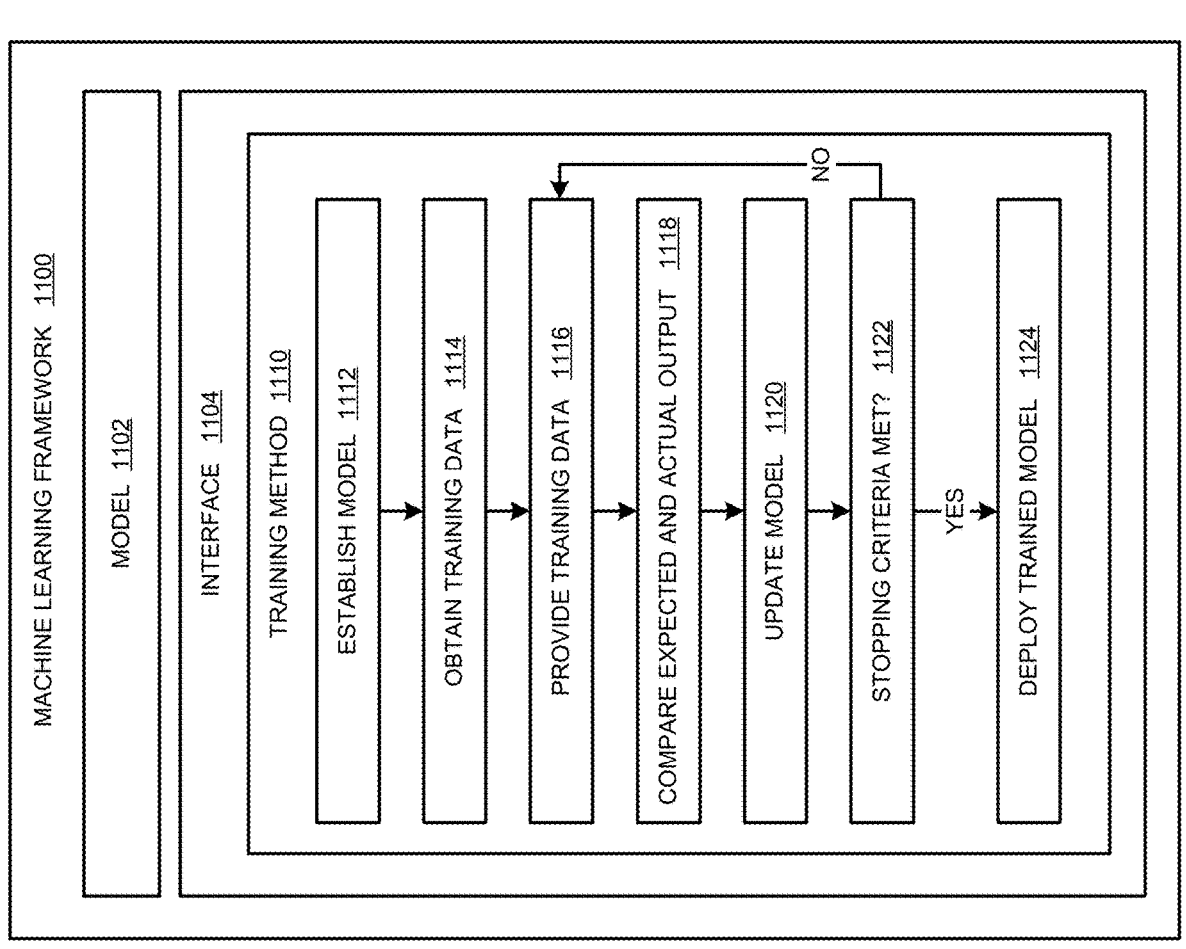

FIG. 11 illustrates an example machine learning framework 1100 that techniques described herein may benefit from or improve on. A machine learning framework 1100 is a collection of software and data that implements artificial intelligence trained to provide output, such as predictive data, based on input. Examples of artificial intelligence that can be implemented with machine learning way include neural networks (including recurrent neural networks), language models (including so-called "large language models"), generative models, natural language processing models, adversarial networks, decision trees, Markov models, support vector machines, genetic algorithms, others, or combinations thereof. A person of skill in the art having the benefit of this disclosure will understand that these artificial intelligence implementations need not be equivalent to each other and may instead select from among them based on the context in which they will be used. Machine learning frameworks 1100 or components thereof are often built or refined from existing frameworks, such as TENSORFLOW by GOOGLE, INC. or PYTORCH by the PYTORCH community.

The machine learning framework 1100 can include one or more models 1102 that are the structured representation of learning and an interface 1104 that supports use of the model 1102.

The model 1102 can take any of a variety of forms. In many examples, the model 1102 includes representations of nodes (e.g., neural network nodes, decision tree nodes, Markov model nodes, other nodes, or combinations thereof) and connections between nodes (e.g., weighted or unweighted unidirectional or bidirectional connections). In certain implementations, the model 1102 can include a representation of memory (e.g., providing long short-term memory functionality). Where the set includes more than one model 1102, the models 1102 can be linked, cooperate, or compete to provide output.

The interface 1104 can include software procedures (e.g., defined in a library) that facilitate the use of the model 1102, such as by providing a way to establish and interact with the model 1102. For instance, the software procedures can include software for receiving input, preparing input for use (e.g., by performing vector embedding, such as using Word2Vec, BERT, or another technique), processing the input with the model 1102, providing output, training the model 1102, performing inference with the model 1102, fine tuning the model 1102, other procedures, or combinations thereof.

In an example implementation, interface 1104 can be used to facilitate a training method 1110 that can include operation 1112. Operation 1112 includes establishing a model 1102, such as initializing a model 1102. The establishing can include setting up the model 1102 for further use (e.g., by training or fine tuning). The model 1102 can be initialized with values. In examples, the model 1102 can be pretrained. Operation 1114 can follow operation 1112. Operation 1114 includes obtaining training data. In many examples, the training data includes pairs of input and desired output given the input. In supervised or semi-supervised training, the data can be prelabeled, such as by human or automated labelers. In unsupervised learning the training data can be unlabeled. The training data can include validation data used to validate the trained model 1102. Operation 1116 can follow operation 1114. Operation 1116 includes providing a portion of the training data to the model 1102. This can include providing the training data in a format usable by the model 1102. The framework 1100 (e.g., via the interface 1104) can cause the model 1102 to produce an output based on the input. Operation 1118 can follow operation 1116. Operation 1118 includes comparing the expected output with the actual output. In an example, this can include applying a loss function to determine the difference between expected and actual. This value can be used to determine how training is progressing. Operation 1120 can follow operation 1118. Operation 1120 includes updating the model 1102 based on the result of the comparison. This can take any of a variety of forms depending on the nature of the model 1102. Where the model 1102 includes weights, the weights can be modified to increase the likelihood that the model 1102 will produce correct output given an input. Depending on the model 1102, backpropagation or other techniques can be used to update the model 1102. Operation 1122 can follow operation 1120. Operation 1122 includes determining whether a stopping criterion has been reached, such as based on the output of the loss function (e.g., actual value or change in value over time). In addition, or instead, whether the stopping criterion has been reached can be determined based on a number of training epochs that have occurred or an amount of training data that has been used. In some examples, satisfaction of the stopping criterion can include If the stopping criterion has not been satisfied, the flow of the method can return to operation 1114. If the stopping criterion has been satisfied, the flow can move to operation 1122. Operation 1122 includes deploying the trained model 1102 for use in production, such as providing the trained model 1102 with real-world input data and produce output data used in a real-world process. The model 1102 can be stored in memory 1014 of at least one computer 1010, or distributed across memories of two or more such computers 1010 for production of output data (e.g., predictive data).

In addition to the depicted components of system 10 in FIG. 1, system 10 can also include many other components including, but not limited to—a public cloud, a private cloud, a gateway, a cloud orchestration module, a computer (which may further include specialized processing circuitry, cache, a communication fabric, a volatile memory, a persistent storage including an operating system, and peripheral devices), Internet of Things (IoT) sensors, a remote database, and a container set.

A device contemplated herein may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database. As is well understood in the art of computer technology, and depending upon the technology, performance of a computer-implemented method may be distributed among multiple computers and/or between multiple locations. Where the detailed discussion in this disclosure is focused on a single computer, such focus is only to keep the presentation as simple as possible. A computer or device contemplated herein may be located in or participate in a cloud, even though it is not shown in a cloud. On the other hand, a computer or device is not required to participate in a cloud except to any extent as may be affirmatively indicated.

A processor device described herein may be of any type now known or to be developed in the future, may be distributed over multiple packages or coordinated integrated circuit chips, and may implement multiple processor threads and/or multiple processor cores. Cache memory may be located in the processor chip package(s) and is typically used for data or code that should be available for rapid access by the threads or cores running on a processor. Cache memories are typically organized into multiple levels depending upon relative proximity to the processing circuitry. Alternatively, some, or all, of the cache for the processor set may be located "off chip." In some computing environments, a processor may be designed for working with qubits and performing quantum computing.

Computer readable program instructions are typically loaded onto a computing device to cause a series of operational steps to be performed by a processor set of the computing device and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache and the other storage media discussed below. The program instructions, and associated data, are accessed by the processor set to control and direct performance of the inventive methods. At least some of the instructions for performing the inventive methods may be stored in a persistent storage.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the embodiments. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment, either locally at a data processing system or over a data network, within the scope of the illustrative embodiments. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment within the scope of the illustrative embodiments. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±10% or 5%, or 2% of a given value.

The descriptions of the various embodiments have been presented for purposes of illustration but are not intended to be exhaustive or limited to the embodiments disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments each have been described by stating their individual advantages, respectively, present application is not limited to a particular combination thereof. To the contrary, such embodiments may also be combined in any way and number according to the intended deployment of present embodiments without losing their beneficial effects.

Techniques herein may be applicable to improving technological processes of a financial institution, such as technological aspects of transactions (e.g., resisting fraud, entering loan agreements, transferring financial instruments, or facilitating payments). Although technology may be related to processes performed by a financial institution, unless otherwise explicitly stated, claimed inventions are not directed to fundamental economic principles, fundamental economic practices, commercial interactions, legal interactions, or other patent ineligible subject matter without something significantly more.

Where implementations involve personal or corporate data, that data can be stored in a manner consistent with relevant laws and with a defined privacy policy. In certain circumstances, the data can be decentralized, anonymized, or fuzzed to reduce the amount of accurate private data that is stored or accessible at a particular computer. The data can be stored in accordance with a classification system that reflects the level of sensitivity of the data and that encourages human or computer handlers to treat the data with a commensurate level of care.

Where implementations involve machine learning, machine learning can be used according to a defined machine learning policy. The policy can encourage training of a machine learning model with a diverse set of training data. Further, the policy can encourage testing for and correcting undesirable bias embodied in the machine learning model. The machine learning model can further be aligned such that the machine learning model tends to produce output consistent with a predetermined morality. Where machine learning models are used in relation to a process that makes decisions affecting individuals, the machine learning model can be configured to be explainable such that the reasons behind the decision can be known or determinable. The machine learning model can be trained or configured to avoid making decisions based on protected characteristics.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A computer-implemented method, comprising:

executing telemetry code on a user device, in a context of a frontend code of an application on the user device, to send telemetry data to a telemetry buffer;

detecting, in the telemetry data received from telemetry code in a frontend code executing on a user device, an anomaly corresponding to a performance metric of the frontend code, wherein the detecting is performed by a Long Short-Term Memory (LSTM) autoencoder model configured to identify a sequential anomaly in a time-series of the telemetry data using a statistical baseline;

mapping the anomaly to a portion of the frontend code as a root-cause of the anomaly;

generating a code patch, the code patch configured to avoid the anomaly;

modifying, in a memory of the user device, the frontend code with the code patch, the modifying causing the modified frontend code to be rendered on the user device;

wherein passing sequences of feature vectors by composing of timing, memory and rendering telemetry data into the LSTM autoencoder which reconstructs each sequence of the feature vectors and returns an anomaly score and metric values exceeding a tunable threshold identify temporal anomalies; and wherein the telemetry data collected by capturing real-time rendering metrics, memory usage and network latency data, and the real-time rendering metrics, the memory usage, the network latency and other similar metrics are accumulated in the telemetry buffer and streamed to monitoring components via a protocol.

2. The computer-implemented method of claim 1, further comprising:

constructing a statistical baseline of a frontend behavior from a training dataset comprising previous frontend performance data; and determining as a part of the detecting, by comparing a datum in the telemetry data to the statistical baseline, that the telemetry data comprises the anomaly.

3. The computer-implemented method of claim 1, further comprising:

training a Machine Learning (ML) model, using a training dataset comprising previous frontend performance data, to identify anomalous frontend behavior;

inputting into the trained ML model the telemetry data; and outputting from the trained ML model, as a part of the detecting, an indication that the telemetry data comprises the anomaly.

4. The computer-implemented method of claim 1, further comprising:

injecting at the user device, in real-time and subsequent to the frontend code of an application being delivered to the user device for rendering, the telemetry code into the frontend code;

collecting, at the user device, the telemetry data from the telemetry code; and transmitting the telemetry data as a time-series.

5. The computer-implemented method of claim 1, further comprising:

constructing a statistical baseline using from historical telemetry data from a past user session, wherein the baseline corresponds to the performance metric, and wherein the performance metric corresponds to at least one of (i) First Contentful Paint (FCP), (ii) Largest Contentful Paint (LCP), (iii) Cumulative Layout Shift (CLS), (iv) Time to Interactive (TTI), (v) Frames Per Second (FPS), (vi) memory usage, and (vii) Application Programming Interface (API) latency.

6. The computer-implemented method of claim 1, wherein the detecting the anomaly further comprises at least one of smoothing a short-term fluctuation in the telemetry data, eliminating an outlier data point in the telemetry data based on a deviation from mean, identifying a seasonality in the telemetry data, and identifying a trend in the telemetry data.

7. The computer-implemented method of claim 1, further comprising:

inputting, the telemetry data into the LSTM autoencoder model; and outputting from the LSTM autoencoder model, as a part of the detecting the anomaly, the sequential anomaly in a time-series of the telemetry data.

8. The computer-implemented method of claim 7, wherein the LSTM autoencoder model has been pretrained using synthetic telemetry trace data indicative of a simulated frontend code behavior.

9. The computer-implemented method of claim 7, wherein the detecting comprises:

causing the LSTM autoencoder model to assign a score to the anomaly; and passing the anomaly to a root-cause mapping tooling to perform the mapping responsive to the score exceeding a threshold.

10. The computer-implemented method of claim 1, wherein the mapping comprises:

matching a first timestamp of the anomaly with a second timestamp of an event recorded in a stack trace of a runtime call stack corresponding to the frontend code; and correlating the portion of the frontend code as the root-cause of the anomaly responsive to the first timestamp being within a threshold period of the second timestamp, and the event being related to an execution of the portion of the frontend code.

11. The computer-implemented method of claim 1, wherein the mapping comprises:

matching a first timestamp of the anomaly with a second timestamp of a lifecycle event of a code component in the frontend code; and correlating the portion of the frontend code as the root-cause of the anomaly responsive to the first timestamp being within a threshold period of the second timestamp, and the code component being related to the portion of the frontend code.

12. The computer-implemented method of claim 1, further comprising:

detecting, in a second telemetry data received from the telemetry code a change in the performance metric;

generating labeled data for a retraining dataset using the anomaly, the code patch, and the change; and retraining a model used in identifying the anomaly using the labeled data.

13. The computer-implemented method of claim 1, further comprising:

detecting, in a second telemetry data received from the telemetry code a change in the performance metric;

generating labeled data for a retraining dataset using the anomaly, the code patch, and the change; and retraining a model used in generating the code patch using the labeled data.

14. The computer-implemented method of claim 1, further comprising:

reviewing the code patch for deployment, wherein the modifying is responsive to the reviewing resulting in an approval.

15. A computer program product comprising one or more computer readable storage media, and program instructions collectively stored on the one or more computer readable storage media, the program instructions executable by a set of one or more processors to cause the set of one or more processors to perform operations comprising:

executing telemetry code on a user device, in a context of a frontend code of an application on the user device, to send telemetry data to a telemetry buffer;

detecting, in the telemetry data received, an anomaly corresponding to a performance metric of the frontend code, wherein the detecting is performed by a Long Short-Term Memory (LSTM) autoencoder model configured to identify a sequential anomaly in a time-series of the telemetry data using a statistical baseline;

mapping the anomaly to a portion of the frontend code as a root-cause of the anomaly;

generating a code patch, the code patch configured to avoid the anomaly;

modifying, in a memory of the user device, the frontend code with the code patch, the modifying causing the modified frontend code to be rendered on the user device;

wherein passing sequences of feature vectors by composing of timing, memory and rendering telemetry data into the LSTM autoencoder which reconstructs each sequence of the feature vectors and returns an anomaly score and metric values exceeding a tunable threshold identify temporal anomalies; and wherein the telemetry data collected by capturing real-time rendering metrics, memory usage and network latency data, and the real-time rendering metrics, the memory usage, the network latency and other similar metrics are accumulated in the telemetry buffer and streamed to monitoring components via a protocol.

16. The computer program product of claim 15, the operations further comprising:

constructing a statistical baseline of a frontend behavior from a training dataset comprising previous frontend performance data; and determining as a part of the detecting, by comparing a datum in the telemetry data to the statistical baseline, that the telemetry data comprises the anomaly.

17. The computer program product of claim 15, the operations further comprising:

training a Machine Learning (ML) model, using a training dataset comprising previous frontend performance data, to identify anomalous frontend behavior;

inputting into the trained ML model the telemetry data; and outputting from the trained ML model, as a part of the detecting, an indication that the telemetry data comprises the anomaly.

18. The computer program product of claim 15, wherein the stored program instructions are stored in a computer readable storage device in a data processing system, and wherein the stored program instructions are transferred over a network from a remote data processing system.

19. The computer program product of claim 15, wherein the stored program instructions are stored in a computer readable storage device in a server data processing system, and wherein the stored program instructions are downloaded in response to a request over a network to a remote data processing system for use in a computer readable storage device associated with the remote data processing system, the operations further comprising:

metering a use of the program instructions associated with the request; and generating an invoice based on the use.

20. A computer system comprising a set of one or more processors and one or more computer readable storage media, and program instructions collectively stored on the one or more computer readable storage media, the program instructions executable by the set of one or more processors to cause the processor to perform operations comprising:

executing telemetry code on a user device, in a context of a frontend code of an application on the user device, to send telemetry data to a telemetry buffer;

detecting, in the telemetry data, an anomaly corresponding to a performance metric of the frontend code, wherein the detecting is performed by a Long Short-Term Memory (LSTM) autoencoder model configured to identify a sequential anomaly in a time-series of the telemetry data using a statistical baseline;

mapping the anomaly to a portion of the frontend code as a root-cause of the anomaly;

generating a code patch, the code patch configured to avoid the anomaly;

modifying, in a memory of the user device, the frontend code with the code patch, the modifying causing the modified frontend code to be rendered on the user device;

wherein passing sequences of feature vectors by composing of timing, memory and rendering telemetry data into the LSTM autoencoder which reconstructs each sequence of the feature vectors and returns an anomaly score and metric values exceeding a tunable threshold identify temporal anomalies; and wherein the telemetry data collected by capturing real-time rendering metrics, memory usage and network latency data, and the real-time rendering metrics, the memory usage, the network latency and other similar metrics are accumulated in the telemetry buffer and streamed to monitoring components via a protocol.

* * * * *